(12) United States Patent
Nagai et al.

(10) Patent No.: US 8,820,988 B2
(45) Date of Patent: Sep. 2, 2014

(54) LIGHTING SYSTEM FOR INSTALLATION IN CEILING PORTION OF PASSENGER COMPARTMENT

(75) Inventors: Kentaro Nagai, Makinohara (JP); Yoshihito Masuko, Makinohara (JP)

(73) Assignee: Yazaki Corporation (JP)

( * ) Notice: Subject to any disclaimer, the term of this patent is extended or adjusted under 35 U.S.C. 154(b) by 552 days.

(21) Appl. No.: 13/133,482

(22) PCT Filed: Dec. 3, 2009

(86) PCT No.: PCT/JP2009/070349
§ 371 (c)(1),
(2), (4) Date: Jul. 28, 2011

(87) PCT Pub. No.: WO2010/067756
PCT Pub. Date: Jun. 17, 2010

(65) Prior Publication Data
US 2011/0273868 A1    Nov. 10, 2011

(30) Foreign Application Priority Data
Dec. 10, 2008   (JP) ................. P2008-314816

(51) Int. Cl.
*B60Q 3/00* (2006.01)
*B60Q 3/02* (2006.01)

(52) U.S. Cl.
CPC .................. *B60Q 3/0279* (2013.01)
USPC ........... 362/490; 362/147; 362/154; 362/471; 362/479

(58) Field of Classification Search
USPC ......... 362/154–156, 471, 479, 490, 147, 234, 362/253
See application file for complete search history.

(56) References Cited

U.S. PATENT DOCUMENTS 7,699,510 B2 *  4/2010  Yoshihara et al. ............ 362/471

FOREIGN PATENT DOCUMENTS

| JP | 62-056349 U | 4/1987 |
|----|-------------|--------|
| JP | 09-058360 A | 3/1997 |
| JP | 2002-293193 A | 10/2002 |
| JP | 2008-221870 A | 9/2008 |
| WO | 2007/002730 A2 | 1/2007 |

OTHER PUBLICATIONS

International Search Report for PCT/JP2009/070349 dated Mar. 9, 2010 [PCT/ISA/210].
Office Action issued on Sep. 18, 2013, by the German Patent and Trade Mark Office in corresponding Application No. 11 2009 003 639.2.
Office Action dated Dec. 6, 2013, issued by the State Intellectual Property Office of the People's Republic of China in counterpart Chinese Application No. 200980149777.1.

* cited by examiner

*Primary Examiner* — Stephen F Husar
(74) *Attorney, Agent, or Firm* — Sughrue Mion, PLLC

(57) ABSTRACT

A lighting system for installation in a ceiling portion of a passenger compartment, including a lamp unit; a selection unit having a different shape from the lamp unit; and a case having a first unit installation opening configured to detachably accommodate the lamp unit and a second unit installation opening configured to detachably accommodate the selection unit. The selection unit may be selected from a plurality of selection units, where the plurality of slection units may each have a different application.

6 Claims, 4 Drawing Sheets

(a-1)

(a-2)

(b-1)

(b-2)

LIGHTING SYSTEM FOR INSTALLATION IN CEILING PORTION OF PASSENGER COMPARTMENT

This application claims the benefit of International Application No. PCT/JP2009/070349 filed Dec. 3, 2009, claiming the benefit of Application No. JP 2008-314816 filed Dec. 10, 2008, in the Japanese Patent Office (JPO), the disclosures of which are incorporated herein in their entirety.

TECHNICAL FIELD

The present invention relates to a lighting system such as a map lamp for installation in a ceiling portion of a passenger compartment.

BACKGROUND ART

For example, a lighting system called a map lamp is provided in a ceiling portion above a front passenger seat of a vehicle, and some of lighting systems of this type have incorporated therein a glasses holder for accommodating sunglasses or the like or a burglar detection sensor. It is also considered that a child mirror (a mirror for monitoring a child seated in a rear seat from the driver's seat) or an ETC terminal (equipment for an automatic toll collection system) is incorporated in the map lamp in place of the glasses holder or the burglar detection sensor.

When the glasses holder or the burglar detection sensor is incorporated in the lighting system, generally, a lamp portion and a glasses holder portion or a sensor portion are incorporated in a single case. Conventionally, a lighting system is fabricated by using a separate exclusive case for each specification. Because of this, different cases need to be prepared for different specifications, that is, a lighting system with a glasses holder or a lighting system with a burglar detection sensor, and the parts control is getting difficult as the number of types of parts involved is increased. In addition, it is not economical that the number of types of cases, which are large molded parts, is increased.

FIGS. 5 and 6 show an example of an overhead console described in Patent Document 1 which includes a conventional glasses holder. In these figures, shaft holes 106 are provided in an overhead console main body (case) 101 into which rotating shafts 103 of a glasses holder 102 are fitted. When the glasses holder 102 is installed in the overhead console main body 101, firstly, the rotating shafts 103 are fitted into the corresponding shaft holes 106. Following this, a damper incorporated spring 104 is attached to the overhead console main body 101 so as to bias the glasses holder 102 in a direction in which the glasses holder 102 is opened. Thus, the fabrication of the overhead console is completed.

In this case, a recessed holder accommodating portion 107 is formed integrally in the overhead console main body 101 into which the glasses holder 102 is accommodated when the glasses holder 102 is rotated to be closed. The accommodation space is closed in an ensured fashion by accommodating the glasses holder 102 in the holder accommodating portion 107. In addition, a gap H is provided between the glasses holder 102 and the overhead console main body 101 for avoiding the interference of the glasses holder 102 with the overhead console main body 101 in consideration of the rotation of the glasses holder 102.

RELATED ART DOCUMENT

Patent Document

Patent Document 1: JP-A-2008-221870

SUMMARY OF THE INVENTION

Problem that the Invention is to Solve

In this way, when the glasses holder is provided in the overhead console, the exclusive case (the overhead console main body) is prepared. Because of this, when a burglar detection sensor is attempted to be provided in place of the glasses holder so as to change the specification of the overhead console, an exclusive case for the burglar detection sensor is necessary.

The invention has been made in view of the situations, and an object thereof is to provide a lighting system for installation in a ceiling portion of a passenger compartment which can realize lighting systems designed to various specifications such as a lighting system with a glasses holder or a lighting system with a sensor by employing one type of common case.

Means for Solving the Problem

With a view to attaining the object, a lighting system for installation in a ceiling portion of a passenger compartment according to the invention is characterized as set forth under (1) and (2) below.

(1) A lighting system for installation in a ceiling portion of a passenger compartment characterized by comprising:
a lamp unit;
a selection unit which has a different shape from that of the lamp unit; and
a case including a first unit installation opening for detachably accommodating the lamp unit and a second unit installation opening for detachably accommodating the selection unit, and wherein the selection unit, which is selected arbitrarily from a plurality of selection units whose applications are different, is accommodated in the second unit installation opening.

(2) A lighting system for installation in a ceiling portion of a passenger compartment as set forth under (1) above, wherein the selection unit is an accommodation unit having an accommodation space for accommodating an article in an interior thereof, and the accommodation unit has a main body which is fixed to the case and a lid member which is provided rotatably on the main body so as to close the accommodation space which is open by being rotated from an open position to a closed position.

According to the lighting system for installation in a ceiling portion of a passenger compartment which is configured as described under (1), by installing any specific selection unit which is selected arbitrarily from the plurality of selection units whose applications are different in the unit installation opening in the case, the lighting system can be made to various predetermined specifications each having the selection unit specific thereto while using the single type of case as a common part. Consequently, the parts control is made easy and the costs for parts are reduced by making the case, which is the large part, common to reduce the number of types of parts involved. In addition, when fixing clips are provided on the selection units for direct engagement with a vehicle body, the position, number and attaching angle of clips can be set for each selection unit, and therefore, an optimum fixing construction can be realized for each of the selection units.

According to the lighting system for installation in a ceiling portion of a passenger compartment as set forth under (2), the accommodation unit itself includes both the main body and the lid member which can close the accommodation space. Because of this, irrespective of how the accommodation unit is connected to the case, once a positional relationship and a dimensional relationship between the main body and the lid member on the same unit are determined, the accommodation space can be closed in an ensured fashion. No specific extra gap needs to be provided between the case and the accommodation unit in consideration of the rotation of the lid member. Thus, the necessity of providing a large gap can be obviated, whereby the external appearance of the lighting system can be improved accordingly. In addition, in opening or closing the accommodation space by rotating the lid member, the case becomes an element which has nothing to do with the function of the accommodation unit. Thus, even in the event that the case is slightly deformed in fixing the case to the vehicle body, there is no fear that the deformation causes a problem in opening or closing the accommodation unit, and there is caused no such situation that the lid member rubs against the case to generate abnormal noise when the lid member is opened or closed.

Additionally, the configuration of the case can be simplified by the accommodation unit itself including both the main body and the lid member that can close the accommodation space. Namely, there is no need to provide a wall which defines part of the accommodation space on the case side, and an opening only has to be provided in the case so as to simply penetrate the case as the unit installation opening. Consequently, the shape of the case can be made simple, whereby a mold used to mold a case of a resin can be made so simple that in molding a case, there can be provided a clearance for providing reinforcement ribs on a circumferential wall of the unit installation opening. Then, by providing the reinforcement ribs, the deformation of the unit installation opening can be prevented, as a result of which a smaller gap can be set between the accommodation unit and the case. An improvement in external appearance of the lighting system can be realized in this respect, too.

Advantage Of The Invention

According to the invention, the lighting system can be made to various predetermined specifications each having the selection unit specific thereto while using the single type of case as a common part. Consequently, the parts control is made easy and the costs for parts are reduced by making the case, which is the large part, common to reduce the number of types of parts involved.

Thus, the invention has been described briefly. Further, the details of the invention will be made clearer by perusing a mode for carrying out the invention, which will be described below, by reference to accompanying drawings.

MODE FOR CARRYING OUT THE INVENTION

Hereinafter, a preferred embodiment according to the invention will be described in detail based on the drawings.

Figure 1:
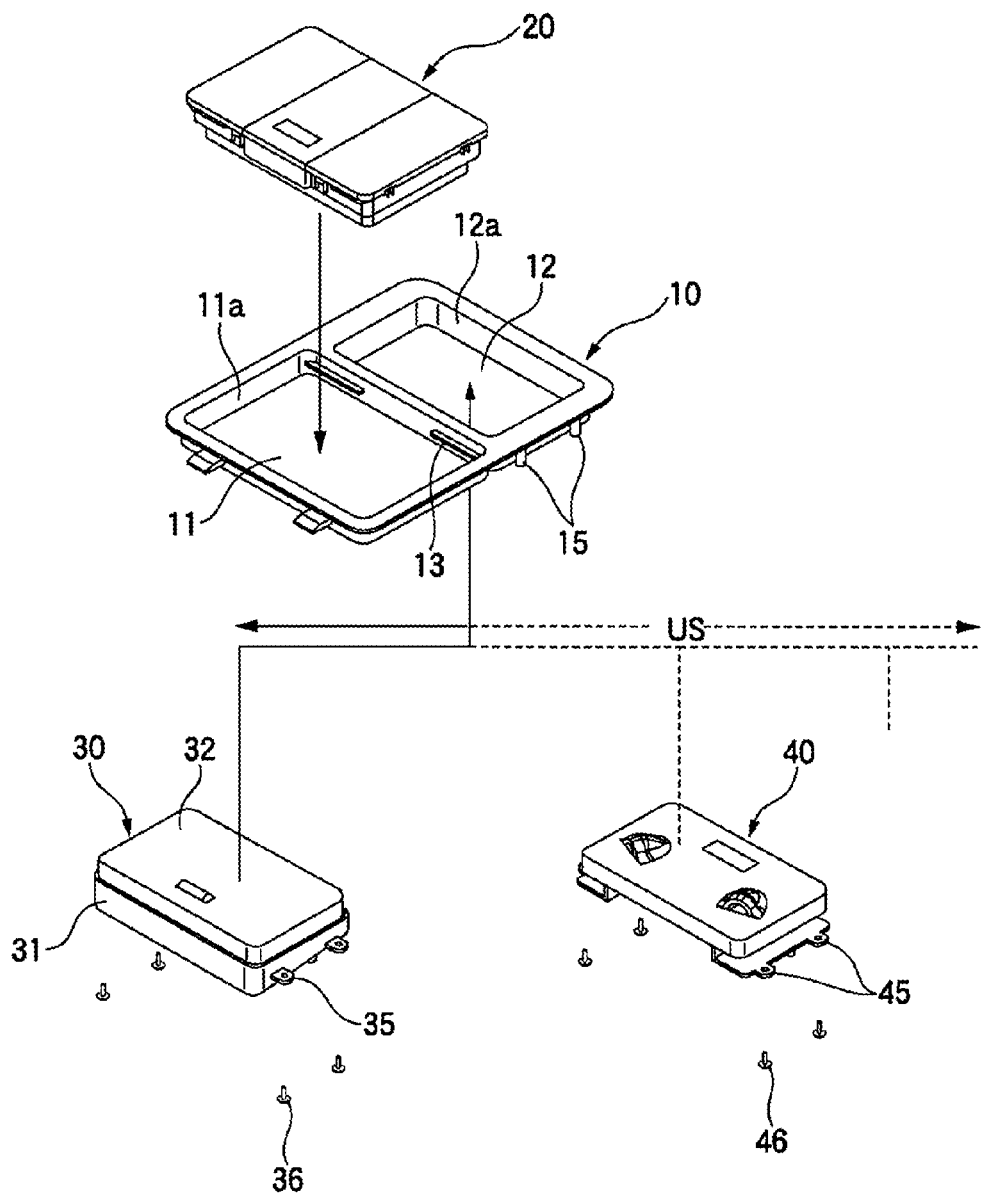
FIG. 1 is a perspective view showing a state resulting before fabrication of a lighting system for installation in a ceiling portion of a passenger compartment according to an embodiment of the invention.
Figure 2:
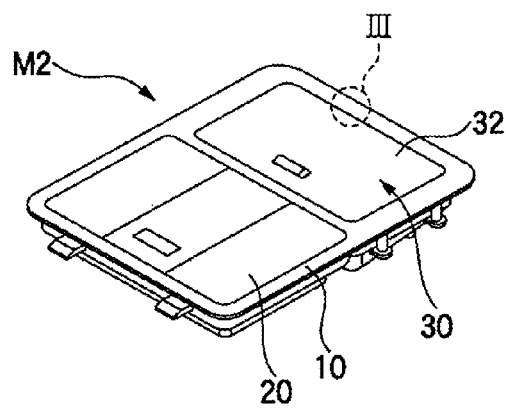
FIG. 2 shows perspective views of the lighting system which is completed, of which (*a*-1) is a perspective view of the lighting system when it is made to a specification including an accommodation unit showing a design surface which is situated on an inner side of a passenger compartment, (*b*-1) is a perspective view of the lighting system showing a rear surface side thereof, (*a*-2) is a perspective view of the lighting system when it is made to a specification including a sensor unit showing a design surface which is situated on the inner side of the passenger compartment, (*b*-2) is a perspective view of the lighting system showing a rear surface side thereof.
Figure 2:
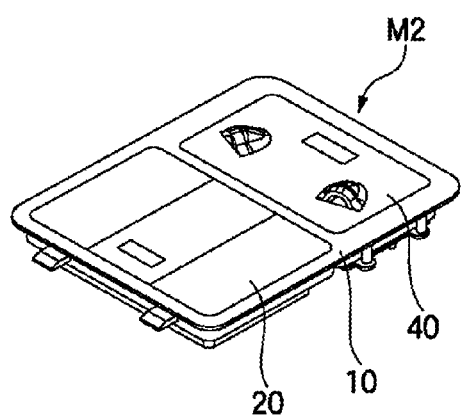
Figure 2:
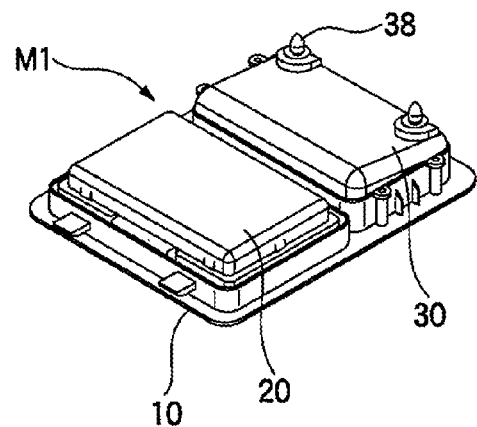
Figure 2:
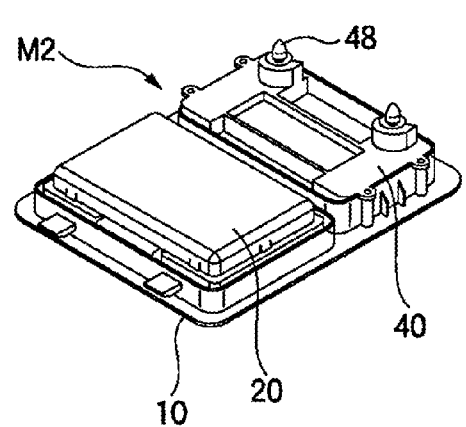
Figure 3:
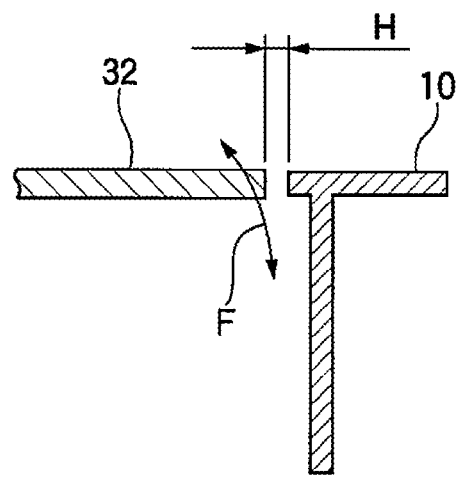
FIG. 3 is a sectional view of a portion III in FIG. 2(*a*-1).
Figure 4:
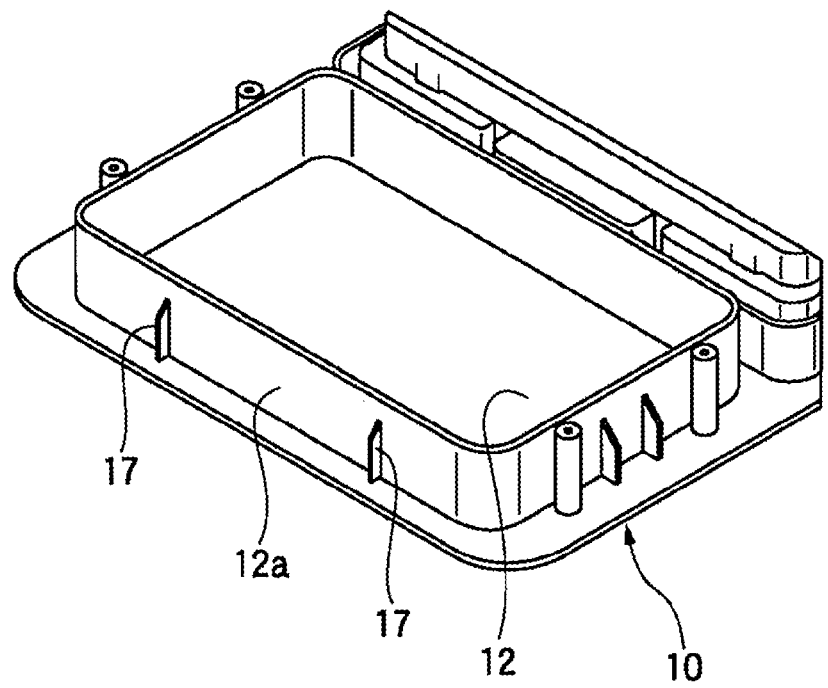
FIG. 4 is a perspective view of part of the case shown in FIG. 1 when the cause is turned inside out.

FIG. 1 is a perspective view showing a state resulting before fabrication of a lighting system for installation in a ceiling portion of a passenger compartment according to the embodiment, and FIG. 2 shows perspective views of the lighting system which is completed, of which (*a*-1) is a perspective view of the lighting system when it is made to a specification including an accommodation unit showing a design surface which is situated on an inner side of a passenger compartment, (*b*-1) is a perspective view of the lighting system showing a rear surface side thereof, (*a*-2) is a perspective view of the lighting system when it is made to a specification including a sensor unit showing a design surface which is situated on the inner side of the passenger compartment, (*b*-2) is a perspective view of the lighting system showing a rear surface side thereof. In addition, FIG. 3 is a sectional view of a portion III in FIG. 2(*a*-1), and FIG. 4 is a perspective view of part of the case shown in FIG. 1 when the cause is turned inside out.

This lighting system is a map lamp installed in a ceiling portion above a central position between front seats and includes a frame-shaped case 10 having two first and second unit installation openings 11, 12, a lamp unit 20 which is detachably accommodated or installed in the first unit installation opening 11 and a selection unit such as an accommodation unit 30 or a sensor unit 40 which is selected from a selection unit group US of selection units including a plurality of units whose applications are different for installation in the second unit installation opening 12. The selection unit group US may include a child mirror, an ETC terminal and other units.

The accommodation unit 30 is such as to have an accommodation space for accommodating an article such as sunglasses in an interior thereof and has a main body 31 which is fixed to the case 10 and a lid member 32 which is provided rotatably on this main body 31 so as to close the accommodation space which is opened by being rotated from an open position to a closed position.

The case 10 and the accommodation unit 30 are each made of a resin molded part in whole. In addition, the lamp unit 20 and the sensor unit 40, which are external installation members, are also made of a resin molded part. The two unit installation openings 11, 12 in the case 10 are both formed as a simple rectangular opening which matches an external shape of the unit which is installed therein. Fixing portions 13 are provided on an inner surface of a circumferential wall 11*a* of the first unit installation opening 11 which are adapted to position the lamp unit 20 and fix the lamp unit 20 in place so as to prevent the dislocation thereof when the lamp unit 20 is installed in the first unit installation opening 11. In addition, boss portions 15 are provided on an external surface of a circumferential wall 12a of the second unit installation opening 12 to which brackets 35, 45 provided on the accommodation unit 30 and the sensor unit 40 are fastened with screws 36, 46 when the accommodation unit 30 and the sensor unit 40 are installed in the second unit installation opening 12.

Additionally, as is shown in FIGS. 2(b-1), 2(b-2), clips 38, 48 are provided on their rear surface side of the units 30, 40 so as to project therefrom with which the units 30, 40 can be fixed directly to the vehicle body. In addition, dimensions of the second unit installation opening 12 are set so that when the accommodation unit 30 is installed in the second unit installation opening 12, a gap H can be defined between the case 10 and the lid member 32 of the accommodation unit 30 as is shown in FIG. 3 which avoids the interference of the lid member 32 with the case 10 when the lid member 32 is rotated. As is shown in FIG. 4, reinforcement ribs 17 are provided at appropriate locations on the external surface of the circumferential wall 12a of the second unit installation opening 12 which reinforce the circumferential wall 12a.

When fabricating the lighting system of this embodiment, the lamp unit 20 is installed in the first unit installation opening 11 in the case 10. Then, one selection unit is selected from the unit selection group US for installation in the second unit installation opening 12 in the case 10. For example, when the accommodation unit 30 is selected for installation, a map lamp M1 can be obtained which is made to a specification including the accommodation unit as is shown in FIGS. 2(a-1), 2(b-1). In addition, when the sensor unit 40 is selected for installation, a map lamp M2 can be obtained which is made to a specification including the sensor unit as is shown in FIGS. 2(a-2), 2(b-2).

When the map lamps made to the different specifications are attempted to be obtained, the map lamp (the lighting system) can be made to the predetermined specifications each having the selection unit specific thereto (the accommodation unit 30 or the sensor unit 40) while using the single type of case 10 as a common part. Because of this, the parts control is made easy and the costs for parts are reduced by making the case 10, which is the large part, common to reduce the number of types of parts involved.

In addition, as in this embodiment, when the fixing clips 38, 48 are provided on the selection units (the accommodation unit 30 and the sensor unit 40) for direct engagement with the vehicle body, the position, number and attaching angle of the clips can be set for each selection unit. Because of this, an optimum fixing construction can be realized for each of the selection units.

The accommodation unit 30 itself includes both the main body 31 and the lid member 32 which can close the accommodation space. Because of this, irrespective of how the accommodation unit 30 is connected to the case 10, once a positional relationship and a dimensional relationship between the main body 31 and the lid member 32 on the same unit 30 are determined, the accommodation space can be closed in an ensured fashion. Consequently, no specific extra gap needs to be provided between the case 10 and the accommodation unit 30 in consideration of the rotation of the lid member 32, which can obviate the necessity of providing a large gap, whereby the external appearance of the map lamp or the lighting system can be improved accordingly. Namely, the gap H in FIG. 3 can be made smaller, and therefore, the deterioration in external appearance due to the gap getting larger can be avoided.

In addition, in opening or closing the accommodation space by rotating the lid member 32, the case 10 becomes an element which has nothing to do with the function of the accommodation unit 30. Thus, even in the event that the case 10 is slightly deformed in fixing the case 10 to the vehicle body, there is no fear that the deformation causes a problem in opening or closing the accommodation unit 30, and there is caused no such situation that the lid member 32 rubs against the case 10 to generate abnormal noise when the lid member 32 is opened or closed.

Figure 5:
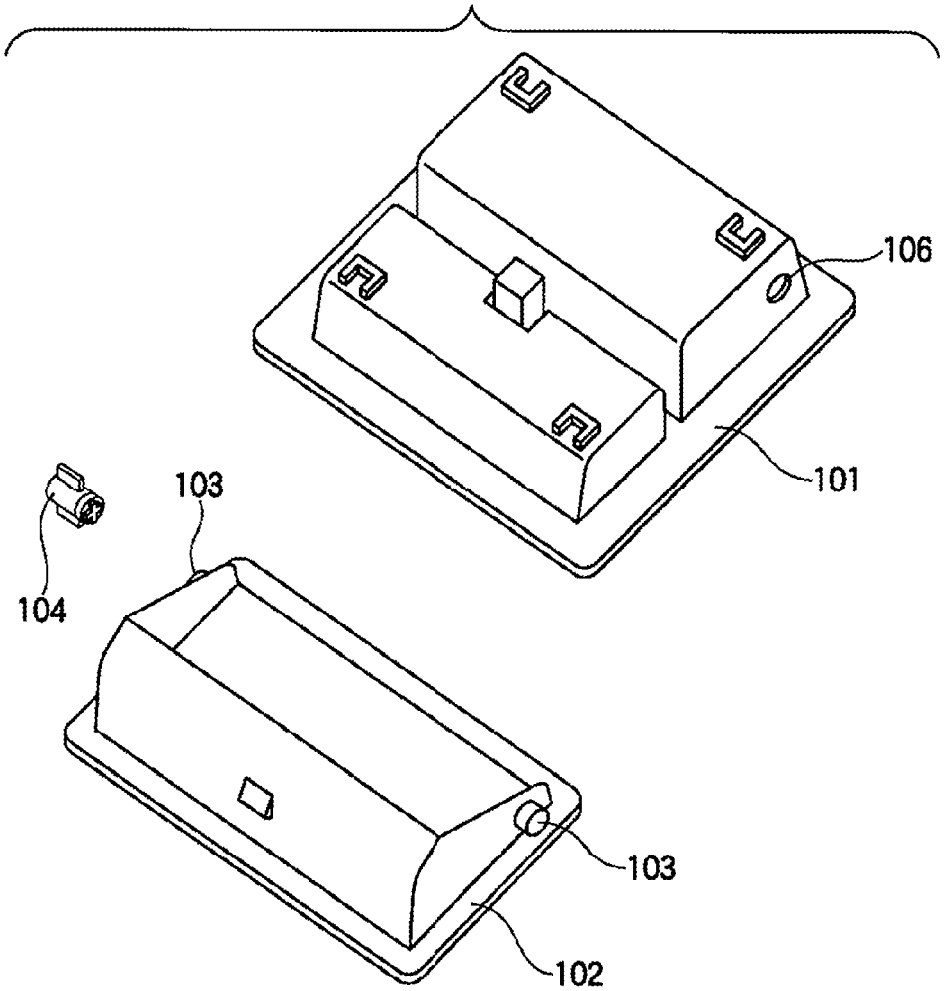
FIG. 5 is a perspective view showing a conventional example.
Figure 6:
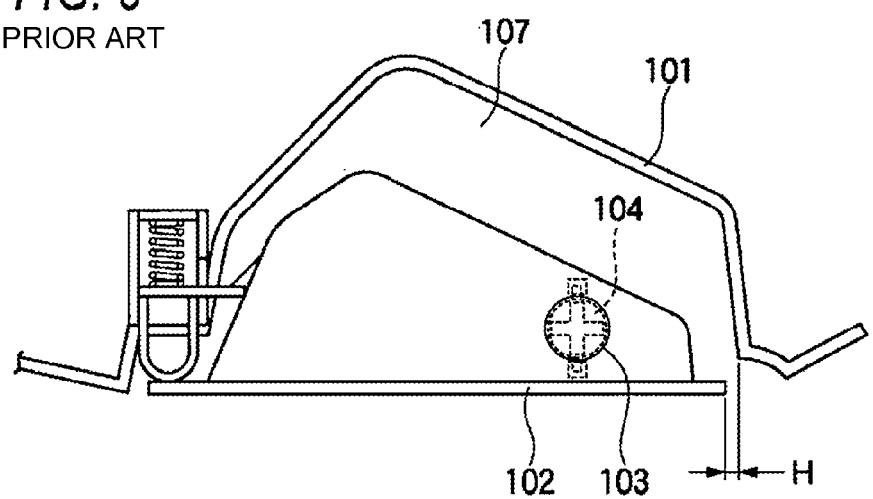
FIG. 6 is a sectional view showing the conventional example.

Additionally, the configuration of the case can be simplified by the accommodation unit 30 itself including both the main body 31 and the lid member 32 which can close the accommodation space. Namely, there is no need to provide a wall which defines part of the accommodation space on the case 10 side, which is the case with the conventional map lamp shown in FIGS. 5 and 6, and the opening only has to be provided in the case 10 so as to simply penetrate the case 10 as the unit installation opening 12. Consequently, the shape of the case 10 can be made simple, whereby not only can a mold used to mold a case of a resin be made simple in configuration, but also in molding a case, there can be provided a clearance for providing the reinforcement ribs 17 on the circumferential wall 12a of the unit installation opening 12. Then, by providing the reinforcement ribs 17, the deformation of the unit installation opening 12 can be prevented, as a result of which a smaller gap can be set between the accommodation unit 30 and the case 10. An improvement in external appearance of the map lamp or the lighting system can be realized in this respect, too.

The invention is not limited to the embodiment that has been described heretofore but can be modified or improved as required. In addition, the materials, shapes, dimensions, numbers, disposing locations of the constituent elements in the embodiment described above are arbitrary and are not limited to those described in the embodiment, provided that they can achieve the invention.

For example, in the embodiment, while the lamp unit 20 is described as being configured as the separate member from the case 10 so that the lamp unit 20 is installed in the case 10 afterwards, a configuration may be adopted in which a lamp unit 20 is incorporated integrally in a case 10 from the beginning.

While the invention has been described in detail by reference to the specific embodiment, it is obvious to those skilled in the art to which the invention pertains that various alterations or modifications can be made thereto without departing from the spirit and scope of the invention.

This patent application is based on Japanese Patent Application (No. 2008-314816) filed on Dec. 10, 2008, the contents of which are to be incorporated herein by reference.

Description Of Reference Numerals And Character 10 case; 11 first unit installation opening; 12 second unit installation opening; 17 reinforcement rib; 20 lamp unit; 30 accommodation unit (selection unit); 31 main body; 32 lid member; 38 clip; 40 sensor unit (selection unit); 48 clip; US selection unit group.

The invention claimed is:

1. A lighting system for installation in a ceiling portion of a passenger compartment comprising:
   a lamp unit;
   a selection unit having a different shape from a shape of the lamp unit; and
   a case including a first unit installation opening configured to detachably accommodate the lamp unit and a second unit installation opening configured to detachably accommodate the selection unit, wherein the selection unit is selected from a plurality of selection units, the plurality of selection units each having a different applications.

2. The lighting system for installation in a ceiling portion of a passenger compartment according to claim 1, wherein the selection unit is an accommodation unit having an accommodation space for accommodating an article in an interior thereof, and the accommodation unit has a main body fixed to the case and a lid member rotatably connected to the main body so as to close the accommodation space, configured to be opened by being rotated from an open position to a closed position.

3. The lighting system for installation in a ceiling portion of a passenger compartment according to claim 1, wherein the selection unit is a sensor unit.

4. The lighting system for installation in a ceiling portion of a passenger compartment according to claim 1, wherein the selection unit includes clips provided on a rear side of the selection unit to directly connect the selection unit to a body of a vehicle.

5. The lighting system for installation in a ceiling portion of a passenger compartment according to claim 1, wherein the first unit installation opening includes at least one inner wall having fixing portions provided thereon to position and fix the lamp unit in the first unit installation opening.

6. The lighting system for installation in a ceiling portion of a passenger compartment according to claim 1, wherein the second unit installation opening includes at least one outer wall having boss portions provided thereon, the boss portions configured to attach to brackets provided on the plurality of selection units.

* * * * *